US011196255B2

(12) United States Patent
Torvund (10) Patent No.: US 11,196,255 B2
(45) Date of Patent: Dec. 7, 2021

(54) POWER SUPPLY SYSTEM FOR AN OFFSHORE PLATFORM

(71) Applicant: Equinor Energy AS, Stavanger (NO)

(72) Inventor: Trond Normann Sivertsen Torvund, Frekhaug (NO)

(73) Assignee: EQUINOR ENERGY AS, Stavanger (NO)

( * ) Notice: Subject to any disclaimer, the term of this patent is extended or adjusted under 35 U.S.C. 154(b) by 295 days.

(21) Appl. No.: 16/489,718

(22) PCT Filed: Mar. 9, 2018

(86) PCT No.: PCT/NO2018/050070
§ 371 (c)(1),
(2) Date: Aug. 29, 2019

(87) PCT Pub. No.: WO2018/164587
PCT Pub. Date: Sep. 13, 2018

(65) Prior Publication Data
US 2020/0006938 A1    Jan. 2, 2020

(30) Foreign Application Priority Data

Mar. 10, 2017   (GB) .................................... 1703873

(51) Int. Cl.
*H02J 3/00* (2006.01)
*H02J 9/06* (2006.01)
*H02J 13/00* (2006.01)

(52) U.S. Cl.
CPC ................ *H02J 3/00* (2013.01); *H02J 9/062* (2013.01); *H02J 13/0006* (2013.01)

(58) Field of Classification Search
CPC .......... H02J 3/00; H02J 9/062; H02J 13/0006; H02J 2213/10; H02J 13/00006; H02J 9/00;
(Continued)

(56) References Cited

U.S. PATENT DOCUMENTS 2,767,802 A   10/1956 Orrell
3,001,595 A    9/1961 Lucas
(Continued)

FOREIGN PATENT DOCUMENTS

AU   2009100098 A4   4/2009
CN   202391346 U     8/2012
(Continued)

OTHER PUBLICATIONS

International Search Report and Written Opinion, PCT/NO2018/050070, dated Apr. 26, 2018 (9 pp.).
(Continued)

*Primary Examiner* — Ziaul Karim
(74) *Attorney, Agent, or Firm* — Eversheds Sutherland (US) LLP (57) ABSTRACT

An offshore oil and gas platform has a power supply system with a cascaded arrangement for a black start. The power supply system includes a first power supply apparatus for providing power at a first energy level, an uninterruptible power supply arrangement configured to receive power from the first power supply apparatus, wherein the uninterruptible power supply is for powering at least one essential and/or safety critical component, and a second power supply apparatus for providing power at a second energy level to a main power distribution system, wherein the second energy level is higher than the first energy level, wherein the second power supply apparatus includes a power source and a high-power energy storage system capable of supplying power at the second energy level, and wherein the second power supply apparatus can receive and store energy from the first power supply apparatus.

21 Claims, 2 Drawing Sheets

(58) Field of Classification Search
CPC ......... Y02B 90/20; Y02B 10/70; Y04S 20/12; Y02E 10/727
See application file for complete search history.

(56) References Cited

U.S. PATENT DOCUMENTS

| | | | |
|---|---|---|---|
| 4,100,752 A | 7/1978 | Tucker | |
| 4,130,076 A | 12/1978 | van Bilderbeek | |
| 4,492,270 A | 1/1985 | Horton | |
| 4,506,735 A | 3/1985 | Chaudot | |
| 4,590,634 A | 5/1986 | Williams | |
| 4,669,917 A | 6/1987 | Sveen | |
| 4,793,418 A | 12/1988 | Wheeler et al. | |
| 5,190,411 A | 3/1993 | Huete et al. | |
| 5,381,865 A | 1/1995 | Blandford | |
| 6,196,322 B1 | 3/2001 | Magnussen | |
| 6,263,971 B1 | 7/2001 | Giannesini | |
| 6,591,775 B2 | 7/2003 | Robinson | |
| 2003/0188873 A1 | 10/2003 | Anderson et al. | |
| 2003/0205789 A1 | 11/2003 | Key et al. | |
| 2008/0162085 A1* | 7/2008 | Clayton | G05B 23/0262 702/188 |
| 2010/0025043 A1 | 2/2010 | Ingebrigtsen et al. | |
| 2010/0071140 A1* | 3/2010 | Williamson | B63B 27/143 14/69.5 |
| 2012/0112546 A1* | 5/2012 | Culver | H02J 7/0029 307/66 |
| 2012/0285656 A1 | 11/2012 | Moore | |
| 2012/0305262 A1 | 12/2012 | Ballard et al. | |
| 2012/0318529 A1 | 12/2012 | Herrold et al. | |
| 2013/0239868 A1 | 9/2013 | Luo | |
| 2013/0272821 A1 | 10/2013 | Ardavanis et al. | |
| 2013/0327535 A1 | 12/2013 | Lamison | |
| 2014/0039707 A1* | 2/2014 | Curtis | F25B 27/00 700/288 |
| 2014/0077607 A1* | 3/2014 | Clarke | H02J 7/0045 307/75 |
| 2015/0096485 A1 | 4/2015 | Morice, III et al. | |
| 2015/0128840 A1 | 5/2015 | Rijken et al. | |
| 2016/0356243 A1* | 12/2016 | Curtis | G06Q 30/0202 |

FOREIGN PATENT DOCUMENTS

| | | |
|---|---|---|
| CN | 202765242 U | 3/2013 |
| CN | 103661827 A | 3/2014 |
| CN | 203504195 U | 3/2014 |
| CN | 103895828 A | 7/2014 |
| CN | 203714155 U | 7/2014 |
| EP | 2592318 A1 | 5/2013 |
| EP | 2709054 A1 | 3/2014 |
| EP | 3046206 A1 | 7/2016 |
| EP | 3051124 A1 | 8/2016 |
| GB | 2050995 A | 1/1981 |
| GB | 2133446 A | 7/1984 |
| GB | 2209781 A | 5/1989 |
| GB | 2231905 A | 11/1990 |
| KR | 20130042815 A | 4/2013 |
| KR | 20140015949 A | 2/2014 |
| MX | 2015000881 A | 3/2015 |
| NO | 924962 L | 6/1994 |
| NO | 20031506 | 1/2004 |
| WO | 0056982 A1 | 9/2000 |
| WO | 0174473 A1 | 10/2001 |
| WO | 2005045307 A1 | 5/2005 |
| WO | 2007011237 A2 | 1/2007 |
| WO | 2007055594 A1 | 5/2007 |
| WO | 2009042307 A1 | 4/2009 |
| WO | 2010020026 A2 | 2/2010 |
| WO | 2015104173 A2 | 7/2015 |
| WO | 2016028158 A1 | 2/2016 |
| WO | 2016122334 A1 | 8/2016 |
| WO | 2017048132 A1 | 3/2017 |
| WO | 2017168143 A1 | 10/2017 |
| WO | 2018052317 A1 | 3/2018 |

OTHER PUBLICATIONS

Search Report of GB 1703873.8, dated Aug. 25, 2017 (3 pp.).
Norsok Standard S-DP-001, Rev. 1, Design Principles Technical Safety, dated Dec. 1994 (54 pp.).
ScandinaviaMideast.com, DNO and RAK Petroleum complete MEAN Merger, Jan. 1, 2017 (2 pp.).
Unmanned Wellhead Platforms, UWHP Summary Report, Ramboll, dated Mar. 17, 2016 (http://www.npd.no/Global/Norsk/3-Publikasjoner/Rapporter/Unmanned-wellhead-platforms/ROGC-Z-RA-000027-1-003.pdf) (27 pp.).
Young, P., Oman crude holds steady above $100 mark amid Crimea political crisis, Apr. 1, 2014 (2 pp.).
New North Sea Unmanned Platforms Save Cost and Could be Used More in the Future, Oil Industry News, Apr. 13, 2016 (2 pp.).

* cited by examiner

Fig. 2

POWER SUPPLY SYSTEM FOR AN OFFSHORE PLATFORM

TECHNICAL FIELD

The present invention relates to a power supply system for an offshore platform of an oil and gas installation and to a method for supplying power to such an offshore platform.

BACKGROUND OF THE INVENTION

Offshore platforms as used in the oil and gas industry require electrical power in order to operate. The electrical power demand for offshore oil and gas platforms is generally increasing as there is a drive to increase automation of equipment on-board the platform and in view of a trend to move away from the use of hydraulics, with previously hydraulic power being replaced by electrical power. It is known for this requirement for electrical power to be met in various ways.

Where the platform is sufficiently close to a suitable power source such as another offshore installation or a coastal facility then electrical power may be supplied via a cable such as subsea cable or a cable supported on a bridge or other structure. However, the use of power cables as the sole power supply becomes difficult when the electrical power increases and when the length of the cable increases. Often an offshore platform will be many kilometres from any other installation and this makes power supply via a cable impractical.

To provide for local power generation at the offshore platform then various systems are used. Power can be generated locally via a generator such as a diesel generator or a gas turbine. A gas turbine can advantageously make use of gas produced at the platform, which avoids the need for refuelling of the platform. Local power can also be provided from solar powered or wind powered systems. Solar and wind powered systems are often only able to provide power intermittently depending on weather conditions, but they do not rely on any connection to an outside source and they also do not require any refuelling.

It is also known to provide batteries or other energy storage at the offshore platform, typically in the context of an uninterruptible power supply (UPS) that is used to maintain operation of essential and/or safety critical components such as ventilation, fire and gas (F&G) systems, and essential communications. These batteries are often relatively low capacity since the essential systems generally do not generate a significant power requirement.

SUMMARY OF THE INVENTION

Viewed from a first aspect, the invention provides a power supply system for an offshore oil and gas platform, the power supply system comprising: a first power supply apparatus for providing power at a first energy level; an uninterruptible power supply arrangement configured to receive power from the first power supply apparatus, wherein the uninterruptible power supply is for powering at least one essential and/or safety critical component of the oil and gas platform; a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and a control system for controlling the first and second power supply apparatuses, wherein the control system is arranged to perform a black start routine to provide full power to the offshore platform via the main power distribution system after a shutdown of the power source in the second power supply apparatus, the black start routine comprising: using the first power supply apparatus to initiate the uninterruptible power supply and thereby power up the at least one essential and/or safety critical component; and then using the high-power energy storage system to power up the power source.

This power supply system has the capability to start up from shutdown without the need for large amounts of external power and without any external intervention being required. Advantageously the power supply system can be started without any external intervention and with an unmanned platform, such that the black start routine may be triggered remotely with the main power distribution system coming online under remote control. This has significant advantages for offshore oil and gas platforms since they are often some distance from a manned site and there can be significant losses in production if the platform cannot undergo a black start without manned intervention. In some examples the offshore platform is an unmanned platform as discussed further below. The invention extends to an offshore oil and gas platform including a power supply system as described in relation to the first aspect and optionally with features as set out below.

The proposed power supply system makes use of a cascade arrangement with particular features linked to the uninterruptible power supply in order to allow for safe powering up of all of the platform systems. The combination of a first, lower energy, power supply and a second, higher energy, power supply with a high-power energy storage system means that there is power available from the lower power supply for UPS and hence for any safety critical and/or essential components, and that the second power supply apparatus can be initiated only after such any safety critical and/or essential components are already in operation, such that there are fewer restrictions on the nature of the second power supply. Traditionally the use of higher power energy storage systems has been avoided due to their size, cost and/or weight, but the inventors have realised that the advantages of the proposed black start routine are more significant than any disadvantage of having a high-power energy storage system.

The second energy level may for example be at least twice the first energy level, or at least five times the first energy level. In some examples the second energy level is about 10 times the first energy level. For example, the first energy level may be in the range 50-100 kWh whereas the second energy level may be in the range 500-1000 kWh or higher. It will be appreciated that a high-power energy storage system capable of supplying power at the second energy level is significantly larger than energy storage systems typically used for offshore oil and gas platforms.

The main power distribution system may operate with multiple voltage levels and thus may include a transformer system as well as two or more power rails. For example, it is common for oil and gas platforms to include systems requiring 400V, 690V, and 6.6 kV supplies and the main power distribution system may be able to provide such voltages.

The power source within the second power supply apparatus may comprise a combustion engine such as a diesel generator or a gas turbine powered generator. The use of a gas turbine has advantages since it can be supplied with gas produced locally at the platform and therefore it is not required to refuel the gas turbine. When a gas turbine is provided, during black start there must be gas available on the platform that allows for start-up of the turbine to a state in which it is operating under normal conditions. In some examples gas produced locally may be supplied to the gas turbine during the black start process, in which case the power supply system may be configured to activate a suitable gas supply, for example by opening valves and so on, prior to start-up of the gas turbine. This may be done using the uninterruptible power supply and/or using the high-power energy power storage system, depending on the nature of the equipment on the platform that requires activation to supply gas to the turbine. Alternatively or additionally, to ensure that there is always sufficient gas on the platform to enable start-up during black start conditions, the main gas stores on the platform may be prevented from being depleted below a predetermined level or a black-start gas reservoir may be provided that can supply gas to the turbine during a black start routine. Such a black start gas reservoir may be supplied by and maintained at a sufficient level to allow for gas turbine start-up with gas produced locally at the platform, or by gas that is transported to the platform from an external source. The start-up sequence for the gas turbine may also use stored compressed air, as mentioned below.

The power source may be capable of supplying energy at a level significantly higher than energy that can be supplied via the high-power energy storage system. For example, the power source may be rated at least at 5 MW, or at least at 10 MW. Where a gas turbine is used then it may be rated at 20 MW or above, for example a 25 MW turbine may be present. The second power supply apparatus can include multiple power sources in some circumstances, for example a generator and a gas turbine. Depending on the equipment installed on the platform it may be beneficial to have a generator for essential equipment and for aiding in starting up gas turbine, the gas turbine providing the primary power source for the main power distribution system. In one example the second power supply apparatus includes a gas turbine rated at the power level higher than the high-power energy storage system as discussed above, but where the high-power energy storage system is capable of starting the gas turbine. Alternatively, the second power supply apparatus may include a generator and gas turbine with the high-power energy storage system capable of starting a generator and a gas turbine being started with power from the generator and/or with power supplied from both of the high-power energy storage system and the generator. Thus, as well as the cascaded nature of the first power supply apparatus and the second power supply apparatus there may be a further cascade type system to be used during the black start routine, where the high power energy storage system is used to power up a first power source such as the generator and this is then used to power up a second power source such as the turbine.

The use of the high-power energy storage system to power up the power source may include a pre-warming phase before ignition of a combustion system of the power source.

The high-power energy storage system of the second power supply apparatus may receive and store energy from the power source during normal use of the offshore platform. Thus, when the platform is in operation then the high-power energy storage system may be maintained in a state with sufficient stored energy for later use during a black start routine. However, it will be appreciated that in some circumstances then there may not be sufficient stored energy for this purpose. For example, if the platform is left without power for a prolonged period then the high-power energy storage system may become depleted. Also, when the platform is first commissioned and/or if the high-power energy storage system requires maintenance or replacement then there may not be sufficient stored energy. In accordance with the first aspect above the high-power energy storage system may also receive power from the first power supply apparatus. As a result, in circumstances where there is not sufficient stored energy in the high-power energy storage system to power up the power source of the second power supply apparatus then the black start routine may include charging the high-power energy storage system using the first power supply apparatus. The black start routine may include a step of checking the energy storage levels in the high-power energy storage system and, after initiation of the uninterruptible power supply, charging the high-power energy storage system using power from the first power supply apparatus until there is sufficient stored power for the high-power energy storage system to power up the power source. The high-power energy storage system may include a battery, for example a lithium ion battery, or any other suitable rechargeable energy storage. Compressed air storage may be included as a part of the energy storage system, for example for the purposes of start-up for a gas turbine as noted above.

The first power supply apparatus supplies power at the first, lower, energy level. The first power supply apparatus may include an appropriate power source, and in some examples advantageously includes multiple redundant power sources. The first power supply apparatus may further include a low-power energy storage system, wherein the low-power energy storage system is capable of supplying power at the first, lower, energy level. The low-power energy storage system may be charged by a power source of the first power supply apparatus. The low-power energy storage system may include a battery such as a lithium ion battery, or it may be any other suitable rechargeable energy storage. As a power source the first power supply apparatus may include one or more of a power cable for connection to a host installation, a solar energy generator, and/or a wind powered energy generator. Two of, or all of, these power sources may be present in order to provide redundancy for the first power supply apparatus.

Where wind and/or solar power is used then it is preferred that this is combined with a low-power energy storage system in view of the potentially intermittent nature of power supplied from such sources. This enables the possibility of a reliable power supply at the energy level for powering the interruptible power supply and carrying out the black start routine, since wind and/or solar power can be used in order to charge the low-power energy storage system to a sufficient degree to power and/or initiate the uninterruptible power supply.

When the first power supply has a power cable for connection to a host installation then this can be for a relatively low-power supply since the proposed cascaded power supply system does not need a large power supply from remote installation. Advantageously, a lower power cable can operate effectively over much greater distances including over many kilometres using a subsea cable. For example, the power supply via the power cable may be rated at 50-200 kW, such as at about 100 kW. Some examples use a DC fibre optic (DCFO) cable as the power cable, which is typically a 400 V DC supply and may require a DC/AC converter in the first power supply system. Power supplied by a power cable may be used directly for powering the uninterruptible power supply. Alternatively or additionally it may be used to charge the low-power energy storage system.

The uninterruptible power supply may have typical features as required for existing uninterruptible power supplies for offshore oil and gas platforms. The uninterruptible power supply supplies power to at least one essential and/or safety critical component of the oil and gas platform, and preferably supplies power to all components deemed essential and/or safety critical in relation to powering up of the power source in the second power supply apparatus. The components deemed essential and/or safety critical may include a ventilation system, a fire and gas (F&G) system, a system for supply of gas to a gas turbine and/or a system to determine the amount of available gas on the platform. On an oil and gas platform ventilation is typically a requirement for power supplies and/or power sources operating at higher powers such as those involved with the second power supply apparatus. This is since without ventilation there can be a dangerous build-up of flammable hydrocarbons leading to a risk of explosion. The second power supply apparatus may be described as a power supply apparatus operating with a higher power level than the first power supply apparatus and requiring ventilation in order to operate.

In embodiments where the power source comprises a gas turbine, a system to determine the amount of available gas on the platform may be employed. This system can ensure that there is a sufficient amount of gas available in the platform's main gas stores and/or in a black start gas reservoir for start-up of the gas turbine engine into a state of normal operation. If it is determined that there is not sufficient gas on the platform for start-up of the gas turbine, the system may subsequently control valves on the platform in order to allow for an amount of produced gas to be supplied to the gas turbine by the platform to enable start-up of the turbine. As noted above, this may be done using power from the uninterruptible power supply and/or from the high-power energy storage system. Alternatively, the system may communicate that a supply of gas must be transported to the platform to allow for gas turbine start-up via a communication system as discussed below.

The control system may be linked with a communication system for use in remote control of the black start routine. The uninterruptible power supply may also provide power for the communication system during the black start routine, such that once the uninterruptible power supply has been initiated then the communication system can be used in relation to remote control and/or remote monitoring of subsequent steps during the black start routine. The communication system may optionally have other functions, for example for controlling and/or monitoring on-going operations at the offshore platform during normal use. The communication system may include a wired communication connection, for example via a subsea communications line, which may be incorporated into an umbilical and/or may make use of a power cable. The communication system may include a wireless communication connection, for example via radio frequency transmissions. In some cases the communication system can include both wired and wireless connectivity for redundancy and/or in order to allow communications both with an installation connected by the wired communication connection and with another installation or a vessel that has a suitable wireless communication system.

In a typical example the power supply system may have a connection via an umbilical to a remote host installation, with the umbilical including a wired communication connection for the communication system and optionally also a power cable to provide a power source for the first power supply apparatus. The umbilical may be the main umbilical for the offshore platform. The remote host installation can trigger the black start routine via the communication system and/or via a signal sent to the first power supply apparatus using other means. Once the uninterruptible power supply has been initiated via the black start routine then the remote host installation can communicate with the offshore platform by the communication system in order to control and/or monitor further progress of the black start routine, for example powering up of a power source for the second power supply apparatus, such as a gas turbine.

The power supply system may include a monitoring system, which may be installed on the offshore platform and/or may also form a monitoring system for more general monitoring of the offshore platform. This may be linked to the communication system to allow for remote monitoring of the power supply system (and optionally also the offshore platform). The monitoring system may include one or more sensors such as cameras, pressure sensors, temperature sensors, and electricity meters such as voltmeters or ammeters in order to monitor aspects of the operation of the offshore platform. The black start routine may include the control system using the monitoring system to check for correct implementation of certain steps of the black start routine before subsequent steps are implemented. Alternatively or additionally the black start routine may include remotely monitoring the power supply system via the communication system to check for correct implementation of certain steps of the black start routine before subsequent steps are implemented.

It will be appreciated that different considerations apply for an oil and gas platform as discussed above as compared to platforms for other purposes, such as offshore wind turbines, offshore tidal power generators and so on. In the case of an oil and gas platform the distances between installations can be very large, several kilometres and more, and therefore it is generally not practical or beneficial to include a dedicated connection to an electricity grid. For this reason, and to minimise the expense of subsea connections to such offshore oil and gas platforms then there are advantages in minimising the requirement at the platform for power from external sources. In contrast to this offshore power generation such as fire wind or tidal power necessarily includes a connection to an electrical grid since the purpose of the offshore installation is to supply power back to the electrical grid. As a consequence power supply systems for that type of offshore installation designs with the intention of making use of a potentially high level of power from an external source, with local power generation being relied upon mainly to cover for the possibility of an interruption in the connection to the grid. In the case of a black start for such installations then power will generally be supplied from outside and/or from local energy storage systems with a relatively low energy level. This is to be contrasted with the current proposals where there is a requirement both for local power generation at a high level, such as via a gas turbine, and also for the platform to be able to power up in a black start with remote control from a host installation that may be many kilometres away.

In example embodiments the offshore platform is an unmanned platform, for example an unmanned production platform or an unmanned wellhead platform. That is to say, it may be a platform that has no permanent personnel and may only be occupied for particular operations such as maintenance and/or installation of equipment. The unmanned platform may be a platform where no personnel are required to be present for the platform to carry out its normal function, for example day-to-day functions relating to handling of oil and/or gas products at the platform. In developing an unmanned platform it is a particular benefit for the need for personnel on the platform to be minimised. Therefore there is a synergy between the feature of an unmanned platform and the proposed power supply system, since the power supply system allows for the operations requiring manned intervention to be reduced compared to prior art power supply systems.

An unmanned platform may be a platform with no provision of facilities for personnel to stay on the platform, for example there may be no shelters for personnel, no toilet facilities, no drinking water and/or no personnel operated communications equipment. The unmanned platform may also include no heli-deck and/or no lifeboat, and advantageously may be accessed in normal use solely by the gangway or bridge, for example via a Walk to Work (W2W) system as discussed above.

An unmanned platform may alternatively or additionally be defined based on the relative amount of time that personnel are needed to be present on the platform during operation. This relative amount of time may be defined as maintenance hours needed per annum, for example, and an unmanned platform may be a platform requiring fewer than 10,000 maintenance hours per year, optionally fewer than 5000 maintenance hours per year, perhaps fewer than 3000 maintenance hours per year.

Viewed from a second aspect, the invention provides a method for supplying power for an offshore oil and gas platform, wherein the platform has a power supply system including: a first power supply apparatus for providing power at a first energy level; an uninterruptible power supply arrangement configured to receive power from the first power supply apparatus, wherein the uninterruptible power supply is for powering at least one essential and/or safety critical component of the oil and gas platform; a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and a control system for controlling the first and second power supply apparatuses; and wherein the method comprises: using a black start routine to provide full power to the offshore platform via the main power distribution system after a shutdown of the power source in the second power supply apparatus, the black start routine comprising: using the first power supply apparatus to initiate the uninterruptible power supply and thereby power up the at least one essential and/or safety critical component; and then using the high-power energy storage system to power up the power source.

The first power supply apparatus may be for providing power at the first energy level only during the black start routine, or alternatively the method may also include use of the first power supply apparatus during normal use of the platform, for example for powering the uninterruptible power supply so that it has a power supply separate from the second power supply apparatus. The method may comprise one or more of: later use of the uninterruptible power supply apparatus for powering the at least one essential and/or safety critical component of the oil and gas platform during normal use of the platform; and/or later use of the second power supply apparatus for providing power at the second energy level to the main power distribution system of the offshore platform during normal use of the platform.

The method may include triggering the black start routine remotely with the main power distribution system hence coming online under remote control. This may be in a situation where the offshore platform is an unmanned platform as discussed above.

The various features of the power supply system may be as discussed above in connection with the first aspect. The method may include appropriate steps involving use of the power supply system during the black start routine and/or during normal use of the offshore platform.

The high-power energy storage system of the second power supply apparatus may receive energy from the power source during normal use of the offshore platform. Thus, when the platform is in operation then the method may include maintaining the high-power energy storage system in a state with sufficient stored energy for later use during a black start routine. Alternatively or additionally the method may include charging the high-power energy storage system using the first power supply apparatus during the black start routine. The black start routine may include a step of checking the energy storage levels in the high-power energy storage system and, after initiation of the uninterruptible power supply, charging the high-power energy storage system using power from the first power supply apparatus until there is sufficient stored power for the high-power energy storage system to power up the power source.

The method may use a first power supply apparatus including a low-power energy storage system and one or more power source such as a power cable for connection to a host installation, a solar energy generator, and/or a wind powered energy generator. The method can include charging the low-power energy storage system via the power source during normal use and/or during the black start routine.

The black start routine of the method may include using the uninterruptible power supply to power a ventilation system for the second power supply apparatus before any steps are taken to power-up the second power supply apparatus, for example before a power source of the second power supply apparatus is powered-up.

In situations where the power source is a gas turbine engine, the black start routine of the method may include using the uninterruptible power supply and/or the high-power energy storage system to power a system for determining the amount of available gas on the platform. If it is determined that the available gas is not sufficient to start the gas turbine, then the method may include activating a supply of gas, such as by controlling valves on the platform, in order to allow for supply of an amount of produced gas to the gas turbine to allow for start-up of the gas turbine. This operation may use power from the uninterruptible power supply and/or the high-power energy storage system.

In example implementations the method includes remote control of the black start routine. The method may include remote monitoring of the platform during normal use and/or during the black start routine. This can involve using a communication system and/or a monitoring system as discussed above.

BRIEF DESCRIPTION OF THE DRAWINGS

Certain embodiments of the present invention will now be described in greater detail by way of example only and with reference to the accompanying drawings, in which.

DETAILED DESCRIPTION

Figure 1:
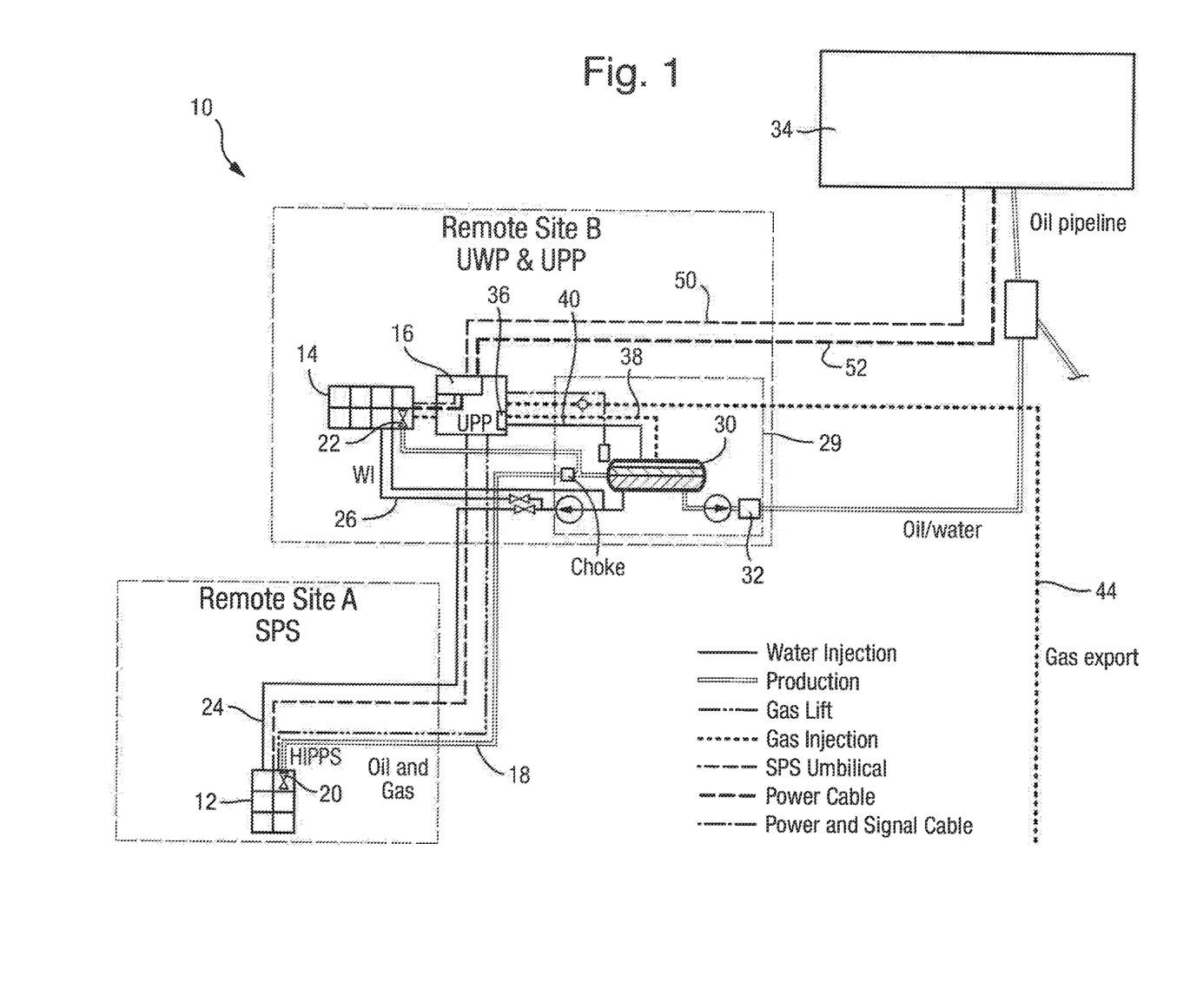
FIG. 1 shows a layout for an offshore field development.
Figure 2:
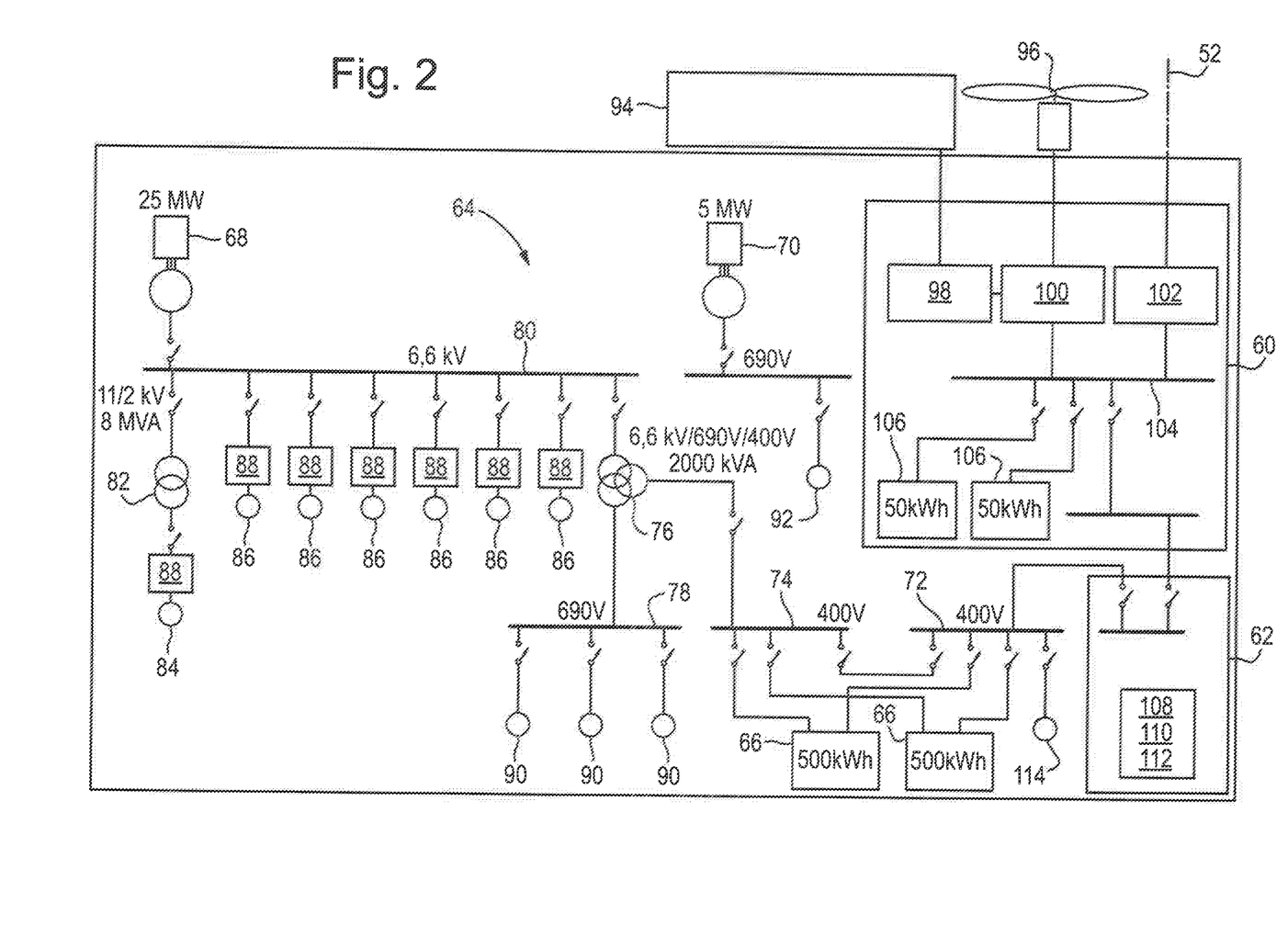
FIG. 2 is a diagram of an example power supply system for an offshore platform.

An example is now described in the context of a possible field development as shown in FIG. 1, with this field development making use of a power supply system as described in FIG. 2. It will of course be appreciated that this is simply an example of one use for the power supply system of FIG. 2 and the power supply system of FIG. 2 could be used with other offshore platforms in other field developments with similar advantages being obtained.

As shown in FIG. 1, a six-slot subsea production system (SPS) 12 is proposed at a first remote site, A, which is spaced apart from a second remote site, B, where it is proposed to locate an Unmanned Wellhead Platform (UWP) 14 and an Unmanned Processing Platform (UPP) 16.

For the purposes of this example, the distance between remote site A and remote site B is approximately 12 km, while the distance from remote site B to the tie-in point at a host pipeline or host installation is approximately 34 km. The water depth both at remote site A and remote site B and in the host area is in the range of 100 to 110 metres, and the seabed bathymetry is in general flat with no major features or pockmarks.

Oil, gas and water from the reservoir of remote site A are produced to the SPS 12. The well fluid is transported through an insulated and heat traced pipe-in-pipe pipeline 18 to remote site B. The UPP subsea and topside facility 16 at remote site B is protected from the high well shut-in pressure by a subsea high-integrity pressure protection system (HIPPS) system 20. Oil, gas and water from the reservoir of remote site B are produced to the UWP 14. The UPP subsea and topside facility 16 is protected from the high well shut-in pressure by a topside HIPPS system 22 on the UWP 14. Injection of water for pressure support is planned for the reservoirs of both remote site A and remote site B via respective water injection pipelines 24, 26.

Produced fluid from remote site A and remote site B is mixed upstream of a subsea separator 30. The subsea separator 30 is a three phase separator operating at approximately 40 bar initially. The temperature in the separator 30 is high (90° C.) and good separation is expected. Oil and water leaving the separator 30 is metered by a multiphase flow meter 32 and exported to a host 34. The receiving pressure at the host 34 will be kept at the same pressure as the subsea separator 30 to avoid flashing and multiphase flow in the export pipeline or inlet heater at the host 34. The oil is only partly stabilised in the subsea separator 30, and further stabilization to pipeline export specification is assumed at the host 34.

The subsea separator 30 and pumps (not shown) are provided as a subsea separator and booster station (SSBS) 29, which is located as close to the UPP 16 as possible to minimise condensation and liquid traps in the gas piping from the separator 30 to the UPP 16. Gas at 40 bar is delivered from the separator 30 to the UPP 16 topside inlet cooler 36 through a dedicated riser 38. The inlet cooler 36 comprises a seawater-cooled shell and tube heat exchanger. TEG is injected into the gas for hydrate inhibition before cooling the gas to 20° C. in the seawater-cooled shell and tube inter stage cooler 36. Condensed water and hydrocarbons are removed in a downstream scrubber 37. Liquid from the scrubber 37 flows by gravitation back down to the subsea separator 30 through a dedicated riser 40. The gas from the scrubber 37 is then compressed to around 80 bar in a first stage compressor with a discharge temperature of around 80° C. The temperature should ideally be as low as possible to reduce the amount of glycol required for dehydration.

An umbilical 50 connects the UPP 16 to the host 34. The umbilical provides remote control of the operations of the UPP 16, as well as of the operations of the SPS 12, UWP 14 and SSBS 29 via secondary umbilicals between the UPP 16, the UWP 14 and the SSBS 29. The secondary umbilicals also supply any required power and chemicals required from the UPP 16 to the SPS 12, UWP 14 and SSBS 29. The umbilical 50 connecting to the host 34 includes a power cable 52, which can be integrated with the umbilical 50 or separate from the umbilical 50. In this example the power cable 52 is a fibre optic cable such as a DCFO type cable, and it may be used in relation to an on-board power supply system of the UPP 16 and/or UWP 14 as shown in FIG. 2.

The power supply system of FIG. 2 can be installed for the UPP 16 and/or the UWP 14. Where the UPP 16 and the UWP 14 are in very close proximity, for example if they are connected by a bridge, then they may share a power supply system. On the other hand, when the UPP 16 and the UWP 14 are remote from one another then they may simply be coupled via an umbilical with a power cable for a low-power connection, such as a DCFO, and each of the UPP 16 and the UWP 14 can have its own power supply system as in FIG. 2. If there is no bridge but the UPP 16 and the UWP 14 are still close to one another, for example within a few hundred metres, then they may be coupled via a subsea power cable with a greater capacity such that some of the parts of the power supply system of FIG. 2 can be shared.

As seen in FIG. 2 the power supply system includes a first power supply apparatus 60, a UPS and black start control system 62, and a main power distribution system 64. The main power distribution system 64 receives power from large batteries 66 providing a high-power energy storage system 66 and also receives power from a gas turbine 68. The gas turbine 68 is a main power source for a second power supply apparatus which includes the batteries 66 and the gas turbine 68 and supplies power to the main power distribution system 64. Optionally, the main power distribution system 64 can include a generator 70, which can have the function of supplying power to essential systems before start-up of the gas turbine 68. However, it is an advantage to avoid the use of a generator 70 since then there is no need for external supply of fuel since the gas turbine 68 can be powered by gas produced at the platform, which in this example is the UPP 16.

In this example there are two batteries 66 rated at 500 kWh allowing for 1000 kWh for the second power supply apparatus when powered by the batteries 66 alone. The gas turbine 68 is rated at 25 MW and generator, where present, might be 5 MW. The main power distribution system 64 operates at various voltages, which in this example include: a 400 V rail 72 for emergency power, which may be supplied from the first power supply apparatus 60; a 400 V rail 74 for main power, which can be from the batteries 66; a 690 V rail 78 for main power, which can also be the voltage from the generator if present; and a 6.6 kV rail 80 for main power, which is the voltage supplied from the gas turbine 68. A transformer 76 is included in the main power distribution system 64 for conversion between the various voltages. There may also be an added transformer such as the transformer 82 in this example for dedicated supply of electricity to high-power loads such as a high pressure gas compressor 84, which might be rated at 5.2 MW.

The main power 6.6 kV rail 80 supplies power to various high-power loads 86 at the platform such as low pressure gas compressors and pumps, which might be rated in the range 1-3 MW. The loads supplied by higher voltages would typically be connected using variable speed drives (VSD) 88. The main power 690 V rail 78 can supply electricity to power lower rated loads 90, typically in the kW range, such as heating and cooling systems and materials handling, for example the platforms main crane. If a diesel generator 70 is present then the 690 V supply might also power a pre-warming system 92. The pre-warming system 92 can be arranged to receive power from the batteries 66 during a start-up phase.

The first power supply apparatus 60 can receive power from the umbilical power cable 52 and it also has a solar energy converter 94 as well as a wind turbine 96. The various power sources 52, 94, 96 are connected via respective converters/regulators 98, 100, 102 to a main voltage rail 104 of the first power supply apparatus 60. A solar energy regulator 98 and wind turbine regulator 100 may be selected as appropriate based on the specifications of the solar energy converter 94 and the wind turbine 96. Typically they may produce outputs in the range 30-60 kW. When the umbilical power cable 52 is a DCFO then it would be connected to the main rail 104 via a DC/AC converter with a 100 kW output. The first power supply apparatus 60 further includes batteries 106. These batteries 106 form a low-power energy storage system 106 with a considerably lower energy capacity and energy output capacity than the high-power energy storage system 66 of the second power supply apparatus. Typically, there may be a factor of 10 difference, as in this case where the high-power energy storage system 66 can output 1000 kWh in total whereas the low-power energy storage system 106 can output 100 kWh. Thus, the power supply system of FIG. 2 has a cascaded arrangement in relation to the energy storage systems as well as in relation to other aspects of the first power supply apparatus 60 as compared to the second power supply apparatus 66, 68, 70.

The two energy storage systems 106, 66 can form the basis for an uninterruptible power supply of the offshore platform, although it will be appreciated that there will be situations where one or both of these energy storage systems 106, 66 are depleted. In the event of a small power outage, for example if the gas turbine 68 is turned off for a small period time, then typically the high-power energy storage system 66 would provide the main basis for the uninterruptible power supply. If there were a longer shutdown of the power sources in the second power supply apparatus then high-power energy storage system 66 may become depleted and in this case the first power supply apparatus with the low-power energy storage system 106 can become the main basis for the uninterruptible power supply. It will be noted that the power cable 52 as well as the solar energy converter 94 and the wind turbine 96 may also provide power for the uninterruptible power supply, as well as supplying energy to be stored in the batteries 106 for the low-power energy storage system 106.

The first power supply apparatus 60 thus supplies power to the UPS and black start control system 62 in an emergency or similar where the turbine 68 (and optionally the generator 70) is not operational. This provides redundancy in situations where the high-power energy storage system 66 can also supply power for the UPS. It also allows for a remotely controlled and unmanned start up sequence in situations where the high-power energy storage system 66 is depleted and where the low-power energy storage system 66 may also be depleted. This is carried out in a black start routine as follows.

First, a signal is received to initiate the black start routine. This may be a signal from the host 34 via the umbilical 50 or power cable 52, or it may be a wireless signal from the host 34 or from elsewhere. When the black start routine begins then the first power supply apparatus 60 supplies power to the UPS and black start control system 62. This may be done immediately if there is a sufficient power supply via the power cable 52 and/or from the batteries 106. Alternatively there may be a charging period where sufficient power is built up in the batteries 106 via charging from one or more of the power cable 52, the solar energy converter 98 or the wind turbine 100. It should be noted that the power cable 52, the solar energy converter 98 and/or the wind turbine 100 can be used to constantly maintain charge in the batteries 106 during periods of shut down for the main power distribution system so that the batteries 106 are ready to supply power to the UPS and black start control system 62 when the signal is received to initiate the black start routine.

When sufficient power is available from the first power supply apparatus then the control system 62 brings the UPS into operation and powers up essential and safety critical components including a ventilation system 108, a fire and gas (F&G) system 110, and a communications system 112. The ventilation system 108 provides ventilation required for safe operation of the second power supply apparatus, such as for safe use of the high-power energy storage system 66 and/or the turbine 68. Ventilation is required in many areas on an offshore oil and gas platform in order that potentially hazardous build-up of flammable hydrocarbons is dispersed. The ventilation may also be required for other equipment on the platform when the platform is fully operational. The F&G system may have features typical for known F&G systems on board similar offshore platforms. The communications system 112 can be a wired and/or wireless system and is primarily for communications with the host 34. A wired communication link with the host 34 may be provided via the umbilical 50. The communications system 112 can provide the host 34 with data from monitoring systems on the platform and allow for remote control and remote monitoring of the black start routine, amongst other things. The UPS may also provide power to other emergency equipment 114 such as an emergency crane.

With the UPS online and each of the ventilation system 108, fire and gas (F&G) system 110, and communications system 112 operational then the control system 62 can monitor the platform and/or the power supply system to ensure that it is appropriate to move to the next phase of the black start routine. The same monitoring may additionally or alternatively be carried out remotely at the host 34, or elsewhere. For example, it may be necessary to wait for a certain level of ventilation or to allow for a certain time of ventilation before aspects of the second power supply apparatus 66, 68 are used. There may be a requirement for the F&G system to confirm that the platform is safe and/or that it is within certain parameters detected by the F&G system. Various sensors such as cameras, pressure sensors, temperature sensors, and electricity meters such as voltmeters or ammeters may be used in order to monitor aspects of the operation of the power supply system and more generally of the other equipment on the platform. The status of the high power energy storage system 66 may also be checked to ensure that sufficient power is available. If the high-power batteries 66 require charging then power can be supplied via the 400 V emergency power supply rail 72 in order to charge the high-power batteries 66.

Once all required safety and operational criteria are met, and when the high-power batteries 66 have sufficient power available, then the black start routine moves to the next phase. This involves the use of the high-power batteries 66 to power up the gas turbine 68, or the generator 70 where a generator is present. A power-up routine for the generator 70 can include pre-warming with the pre-warmer 92 powered by the batteries 66. Where the batteries 66 start the gas turbine 68 then there may be a pre-warming phase before ignition. The high-power energy storage system 66 may also include or be augmented by a compressed air energy storage system for use in starting the turbine 68. Where compressed air is used then this can be kept at a suitable capacity during normal operation of the platform, and if the compressed air store is depleted then it may be recharged during the black start routine. This may be done using power from the high power batteries 66, for example. Gas to power the gas turbine 68 during start-up can be produced gas or gas stored on the platform for the purpose of starting the turbine 68 during black start, when gas production may not be available. In cases where produced gas is used then the black start routine may include activation of a gas supply using power from the UPS and/or the high-power energy storage system 66. The activation of the gas supply may include any suitable sequence of steps, such as opening of valves and so on, as may be used in other situations where produced gas is required for a gas turbine 68 as the main power source on a platform.

When the gas turbine 68 is operational then it may be used to supply power to all of the equipment on the platform 14, 16 via the main power distribution system 64. There may be a staged start up sequence for this equipment in order to ensure correct operation of the equipment and also to avoid excessive load on the turbine 68. When the platform 14, 16 is in normal operation then the high-power energy storage system 66 may be recharged via the main power distribution system 64 and the low-power energy storage system 106 may be recharged via one or more of the power source(s) of the first power supply apparatus 60

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A power supply system for an offshore oil and gas platform, the power supply system comprising:
   a first power supply apparatus for providing power at a first energy level;
   an uninterruptible power supply arrangement configured to receive power from the first power supply apparatus, wherein the uninterruptible power supply is for powering at least one essential and/or safety critical component of the oil and gas platform;
   a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and
   a control system for controlling the first and second power supply apparatuses, wherein the control system is arranged to perform a black start routine to provide full power to the offshore platform via the main power distribution system after a shutdown of the power source in the second power supply apparatus, the black start routine comprising:
   using the first power supply apparatus to initiate the uninterruptible power supply and thereby power up the at least one essential and/or safety critical component; and then using the high-power energy storage system to power up the power source;
   wherein the second energy level is at least five times the first energy level.

2. A power supply system as claimed in claim 1, wherein the power source within the second power supply apparatus comprises a gas turbine powered generator supplied with gas produced locally at the platform.

3. A power supply system as claimed in claim 1, wherein the power source within the second power supply apparatus is capable of supplying energy at a level higher than energy that can be supplied via the high-power energy storage system, and wherein the high-power energy storage system is capable of starting the power source within the second power supply apparatus.

4. A power supply system as claimed in claim 2, wherein the high-power energy storage system of the second power supply apparatus is arranged to receive and store energy from the power source during normal use of the offshore platform and the control system is arranged such that in the event of a black start, when there is not sufficient stored energy in the high-power energy storage system to power up the power source of the second power supply apparatus, then the black start routine includes charging the high-power energy storage system using the first power supply apparatus.

5. A power supply system as claimed in claim 4, wherein the first power supply apparatus has multiple redundant power sources including: a power cable for connection to a host installation, at least one solar energy generator, and/or at least one wind powered energy generator.

6. A power supply system as claimed in claim 5, wherein the first power supply has a power cable for connection to a host installation, the power cable comprising a DC fibre optic cable.

7. A power supply system as claimed in claim 1, wherein the first power supply apparatus includes a low-power energy storage system, wherein the low-power energy storage system is capable of supplying power at the first, lower, energy level and is charged by the power source(s) of the first power supply apparatus.

8. A power supply system as claimed in claim 1, wherein the uninterruptible power supply supplies power to all components deemed essential and/or safety critical in relation to powering up of the power source in the second power supply apparatus.

9. A power supply system as claimed in claim 8, wherein the uninterruptible power supply supplies power to a ventilation system and to a fire and gas (F&G) system, and wherein the second power supply apparatus requires ventilation in order to operate.

10. A power supply system as claimed in claim 8, comprising a communication system linked with the control system for use in remote control of the black start routine, wherein the uninterruptible power supply provides power for the communication system during the black start routine, such that once the uninterruptible power supply has been initiated then the communication system can be used in relation to remote control and/or remote monitoring of subsequent steps during the black start routine.

11. A power supply system as claimed in claim 10, wherein the power supply system has an umbilical for connecting the power supply to a remote host installation, with the umbilical including a wired communication connection for the communication system and a power cable to provide a power source for the first power supply apparatus.

12. A power supply system as claimed in claim 11, wherein the control system is arranged so that the remote host installation can use the umbilical connection to trigger the black start routine via the communication system and/or via a signal sent to the first power supply apparatus using other means.

13. A power supply system as claimed in claim 10, wherein once the uninterruptible power supply has been initiated via the black start routine then the remote host installation can communicate with the offshore platform by the communication system in order to control and/or monitor further progress of the black start routine.

14. A power supply system as claimed in claim 13, wherein the power supply system includes a monitoring system linked to the communication system to allow for remote monitoring of the power supply system, wherein the monitoring system includes one or more sensors such as cameras, pressure sensors, temperature sensors, and electricity meters such as voltmeters or ammeters in order to monitor aspects of the operation of the power supply system.

15. A power supply system as claimed in claim 14, wherein the control system is arranged to use the monitoring system during the black start routine in order to check for correct implementation of certain steps of the black start routine before subsequent steps are implemented.

16. A power supply system as claimed in claim 15, wherein the black start routine includes remotely monitoring the platform via the communication system to check for correct implementation of certain steps of the black start routine before subsequent steps are implemented.

17. An offshore oil and gas platform comprising a power supply system as claimed in claim 1.

18. A platform as claimed in claim 17, wherein the platform is an unmanned platform with no permanent personnel, wherein the unmanned platform has no provision of facilities for personnel to stay on the platform, for example there may be no shelters for personnel, no toilet facilities, no drinking water, no personnel operated communications equipment, no heli-deck and/or no lifeboat; and/or wherein the unmanned platform is arranged such that personnel are required to be present for fewer than 10,000 maintenance hours per year.

19. A power supply system for an offshore oil and gas platform, the power supply system comprising:
 a first power supply apparatus for providing power at a first energy level;
 an uninterruptible power supply arrangement configured to receive power from the first power supply apparatus, wherein the uninterruptible power supply is for powering at least one essential and/or safety critical component of the oil and gas platform;
 a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and
 a control system for controlling the first and second power supply apparatuses, wherein the control system is arranged to perform a black start routine to provide full power to the offshore platform via the main power distribution system after a shutdown of the power source in the second power supply apparatus, the black start routine comprising:
  using the first power supply apparatus to initiate the uninterruptible power supply and thereby power up the at least one essential and/or safety critical component; and then using the high-power energy storage system to power up the power source;
 wherein the first energy level is in the range 50-100 kWh whereas the second energy level is in the range 500-1000 kWh.

20. A method for supplying power for an offshore oil and gas platform, wherein the platform has a power supply system including:
 a first power supply apparatus for providing power at a first energy level;
 an uninterruptible power supply arrangement configured to receive power from the first power supply apparatus, wherein the uninterruptible power supply is for powering at least one essential and/or safety critical component of the oil and gas platform; a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and a control system for controlling the first and second power supply apparatuses; and
 wherein the method comprises:
 using a black start routine to provide full power to the offshore platform via the main power distribution system after a shutdown of the power source in the second power supply apparatus, the black start routine comprising:
  using the first power supply apparatus to initiate the uninterruptible power supply and thereby power up the at least one essential and/or safety critical component; and then using the high-power energy storage system to power up the power source;
 wherein the second energy level is at least five times the first energy level.

21. A method for supplying power for an offshore oil and gas platform, wherein the platform has a power supply system including:
 a first power supply apparatus for providing power at a first energy level;

an uninterruptible power supply arrangement configured to receive power from the first power supply apparatus, wherein the uninterruptible power supply is for powering at least one essential and/or safety critical component of the oil and gas platform; a second power supply apparatus for providing power at a second energy level to a main power distribution system of the offshore platform, wherein the second energy level is higher than the first energy level, wherein the second power supply apparatus comprises a power source and a high-power energy storage system capable of supplying power at the second energy level, and wherein the second power supply apparatus can receive energy from the first power supply apparatus and can store energy from the first power supply apparatus in the high-power energy storage system; and a control system for controlling the first and second power supply apparatuses; and wherein the method comprises:
  using a black start routine to provide full power to the offshore platform via the main power distribution system after a shutdown of the power source in the second power supply apparatus, the black start routine comprising:
    using the first power supply apparatus to initiate the uninterruptible power supply and thereby power up the at least one essential and/or safety critical component; and then using the high-power energy storage system to power up the power source;

wherein the first energy level is in the range 50-100 kWh whereas the second energy level is in the range 500-1000 kWh.

* * * * *